United States Patent
Liu et al.

(10) Patent No.: US 10,826,730 B1
(45) Date of Patent: Nov. 3, 2020

(54) EQUALIZER CIRCUIT

(71) Applicant: REALTEK SEMICONDUCTOR CORP., Hsinchu (TW)

(72) Inventors: Yao-Chia Liu, Hsinchu (TW); Bo-Yu Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/713,121

(22) Filed: Dec. 13, 2019

(30) Foreign Application Priority Data

May 30, 2019 (TW) .............................. 108118822 A (51) Int. Cl.
*H04L 25/03* (2006.01)
(52) U.S. Cl.
CPC .. *H04L 25/03267* (2013.01); *H04L 25/03949* (2013.01); *H04L 2025/03433* (2013.01)
(58) Field of Classification Search
CPC ......... H04L 25/03343; H04L 25/03057; H04L 25/03267; H04L 25/03949; H04L 2025/03433
See application file for complete search history.

(56) References Cited

U.S. PATENT DOCUMENTS

| | | | |
|---|---|---|---|
| 2006/0109940 A1* | 5/2006 | Beukema | H04L 7/0058 375/350 |
| 2006/0188043 A1* | 8/2006 | Zerbe | H04W 52/20 375/346 |
| 2009/0232196 A1* | 9/2009 | Sunaga | H04L 25/03885 375/233 |

* cited by examiner

*Primary Examiner* — Sung S Ahn
(74) *Attorney, Agent, or Firm* — Birch, Stewart, Kolasch & Birch, LLP (57) ABSTRACT

An equalizer circuit includes a first arithmetic circuit, a second arithmetic circuit, a data sampling circuit, and an edge sampling circuit. The first arithmetic circuit is configured to compensate an equalization sequence by secondary feedback sequences to output a first added sequence. The second arithmetic circuit is configured to compensate the first added sequence by a primary feedback sequence to output a second added sequence. The data sampling circuit samples, according to data clock, the second added sequence to output a primary sequence, and gains the primary sequence to output the primary feedback sequence. The data sampling circuit sequentially samples, according to the data clock, the primary sequence to output secondary sequences. The data sampling circuit gains the corresponding secondary sequences to output the secondary feedback sequences. The edge sampling circuit is configured to sequentially sample, according to an edge clock, the first added sequence to output an edge sequence.

11 Claims, 8 Drawing Sheets

FIG. 1

(Prior Art)

EQUALIZER CIRCUIT

CROSS-REFERENCE TO RELATED APPLICATION

This non-provisional application claims priority under 35 U.S.C. § 119(a) to Patent Application No. 108118822 in Taiwan, R.O.C. on May 30, 2019, the entire contents of which are hereby incorporated by reference.

BACKGROUND

Technical Field

The disclosure relates to an equalizer circuit, and in particular, to an equalizer circuit with a primary sequence circuit.

Related Art

Figure 1:
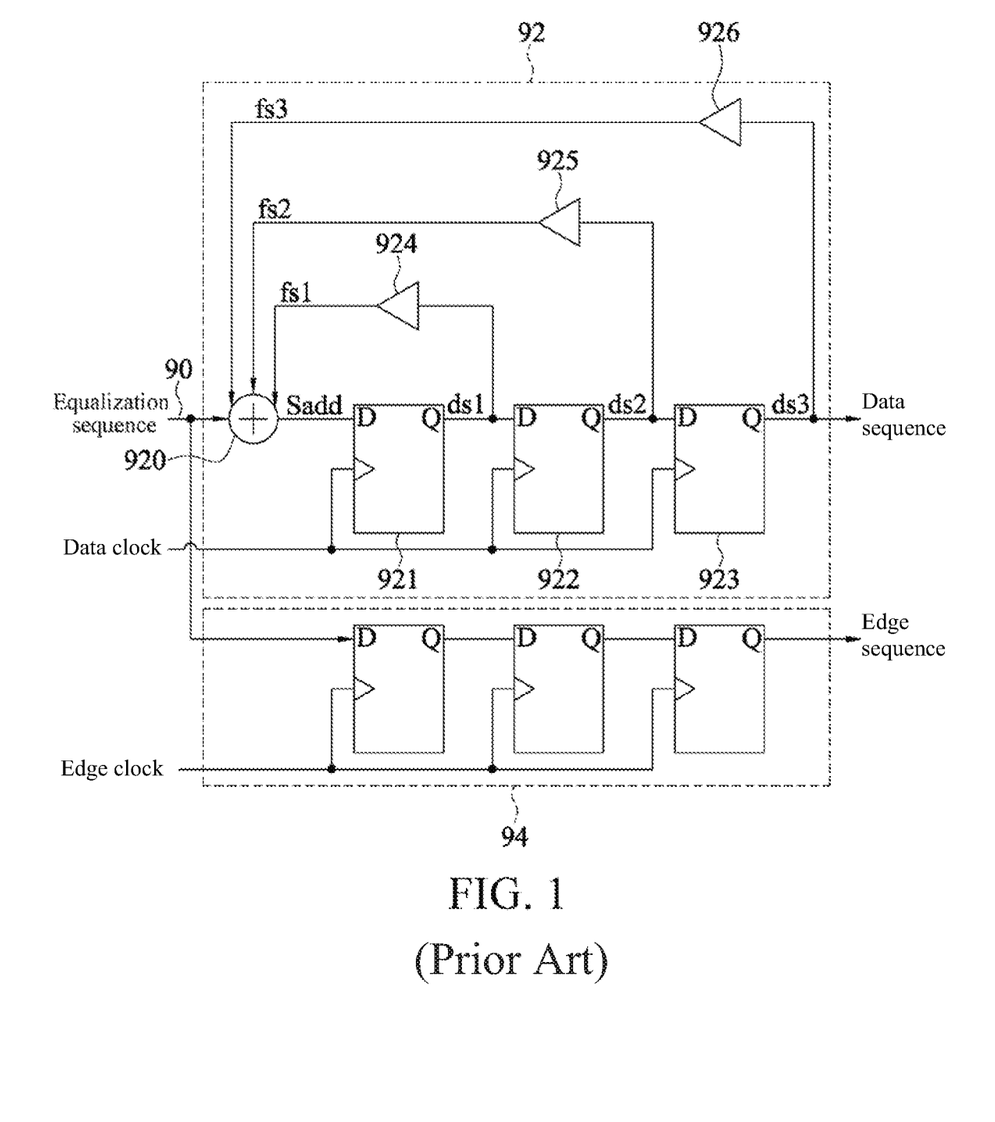
FIG. 1 illustrates a block diagram of a decision feedback equalizer known to the inventor.

Referring to FIG. 1, to the inventors' knowledge, the decision feedback equalizer has an input terminal 90, a data sampling circuit 92, and an edge sampling circuit 94. The data sampling circuit 92 has an adder 920, first to third D-type flip flops 921, 922, 923 connected in series, and first to third amplifiers 924, 925, 926. The adder 920 adds up an equalized sequence from the input terminal 90, a first feedback sequence fs1 from the first amplifier 924, a second feedback sequence fs2 from the second amplifier 925, and a third feedback sequence fs3 from the third amplifier 926, to output an added signal Sadd. The first D-type flip flop 921 samples the added signal Sadd according to a data clock to output a first data sequence ds1, and the first amplifier 924 gains the first data sequence ds1 to output the first feedback sequence fs1. The second D-type flip flop 922 samples the first data sequence ds1 according to the data clock to output a second data sequence ds2, and the second amplifier 925 gains the second data sequence ds2 to output the second feedback sequence fs2. The third D-type flip flop 923 samples the second data sequence ds2 according to the data clock to output a third data sequence ds3, and the third amplifier 926 gains the third data sequence ds3 to output the third feedback sequence fs3.

Figure 2A:
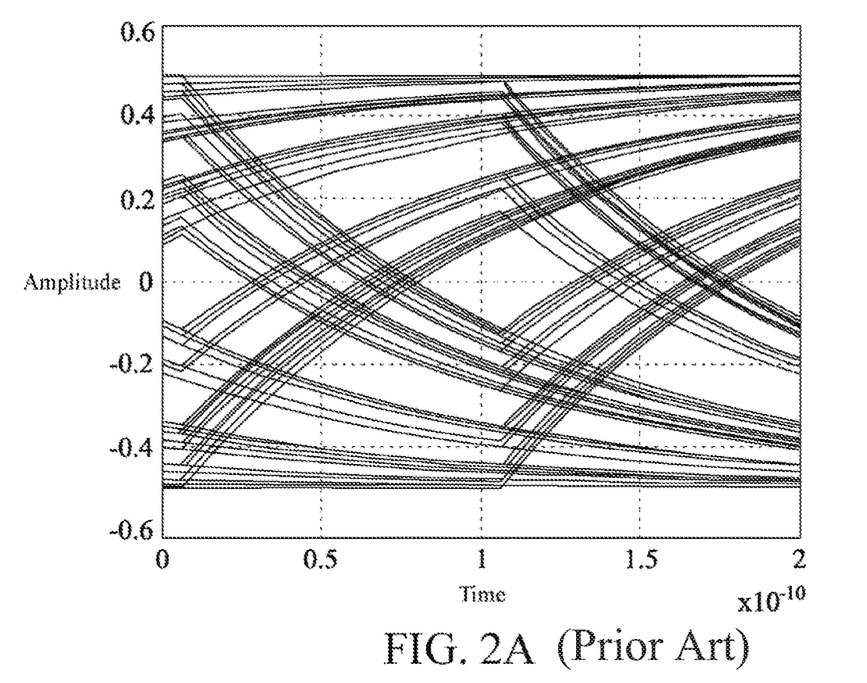
FIG. 2A to FIG. 2B show eye diagrams of an equalization sequence and an added signal during simulation operation of a decision feedback equalizer in FIG. 1.
Figure 2B:
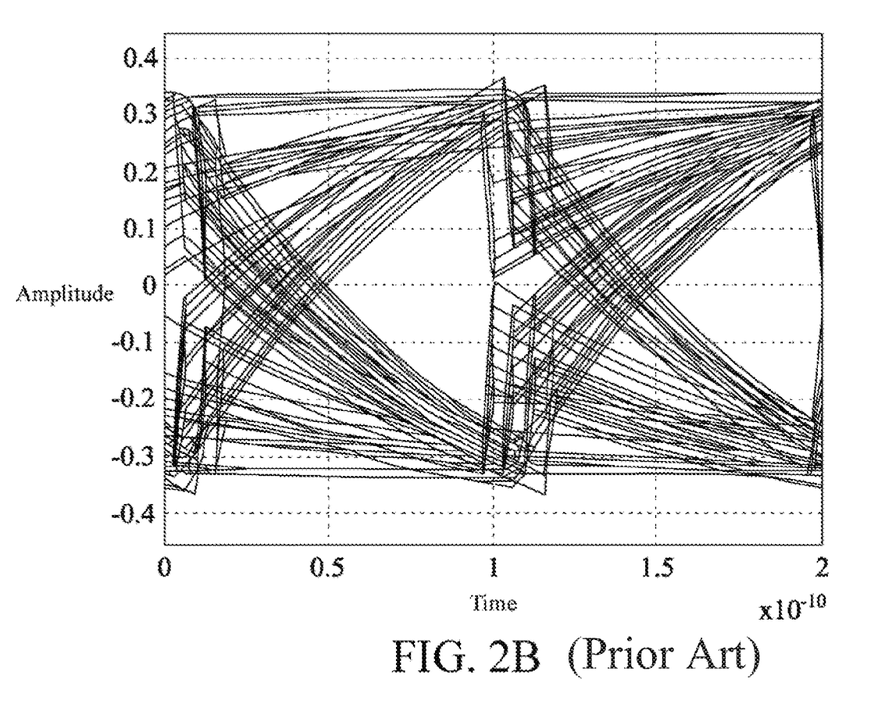

Referring to FIG. 2A and FIG. 2B, FIG. 2A is an eye diagram of the equalization sequence, and FIG. 2B is an eye diagram of an added signal Sadd (which is output from a right side of an adder). Compared with the eye diagram of the equalization sequence shown in FIG. 2A, an amplitude of the added signal shown in FIG. 2B has an edge amplitude shifted towards the left on the data clock. In other words, the adder removes only inter-symbol interference on data without removing inter-symbol interference of the added signal on an edge.

SUMMARY

In view of the foregoing issue, according to some embodiments, an equalizer circuit comprises a first arithmetic circuit, a second arithmetic circuit, a data sampling circuit, and an edge sampling circuit. The first arithmetic circuit is configured to compensate an equalization sequence by a plurality of secondary feedback sequences to output a first added sequence. The second arithmetic circuit is configured to compensate the first added sequence by a primary feedback sequence to output a second added sequence. The data sampling circuit comprises a primary sequence circuit and a plurality of secondary sequence circuits. The primary sequence circuit is configured to sample the second added sequence according to a data clock to output a primary sequence. The primary sequence circuit gains the primary sequence to output the primary feedback sequence. The secondary sequence circuits are configured to sequentially sample the primary sequence according to the data clock to output a plurality of secondary sequences, and the secondary sequence circuits gain the corresponding secondary sequences to output the secondary feedback sequences. The edge sampling circuit is configured to sample the first added sequence according to an edge clock to output an edge sequence.

According to some embodiments.

In some embodiments, a rate of the equalization sequence is substantially twice a rate of the data clock, and the rate of the equalization sequence is substantially twice a rate of the edge clock. The primary feedback sequence comprises a first primary feedback sub-sequence and a second primary feedback sub-sequence. The second added sequence comprises a first added sub-sequence and a second added sub-sequence.

The second arithmetic circuit comprises a first arithmetic sub-circuit and a second arithmetic sub-circuit. The first arithmetic sub-circuit is configured to compensate the first added sequence by the first primary feedback sub-sequence to output the first added sub-sequence. The second arithmetic sub-circuit is configured to compensate the first added sequence by the second primary feedback sub-sequence to output the second added sub-sequence.

The primary sequence circuit comprises a first primary sequence sub-circuit and a second primary sequence sub-circuit. The first primary sequence sub-circuit is configured to sample the first added sub-sequence according to the data clock to output a first primary sub-sequence. The first primary sequence sub-circuit gains the first primary sub-sequence to output the first primary feedback sub-sequence. The second primary sequence sub-circuit is configured to sample the second added sub-sequence according to an inverse of the data clock (the inverse of the data clock is referred to as an ID clock) to output a second primary sub-sequence. The second primary sequence sub-circuit gains the second primary sub-sequence to output the second primary feedback sub-sequence.

The data sampling circuit comprises four of the secondary sequence circuits. The four secondary sequence circuits are a first secondary sequence sub-circuit, a second secondary sequence sub-circuit, a third secondary sequence sub-circuit, and a fourth secondary sequence sub-circuit. The first secondary sequence sub-circuit is configured to sample the first primary sub-sequence according to the ID clock to output a first secondary sub-sequence, and the first secondary sequence sub-circuit gains the first secondary sub-sequence to output a first secondary feedback sub-sequence. The second secondary sequence sub-circuit is configured to sample the second primary sub-sequence according to the data clock to output a second secondary sub-sequence, and the second secondary sequence sub-circuit gains the second secondary sub-sequence to output a second secondary feedback sub-sequence. The third secondary sequence sub-circuit is configured to sample the first secondary sub-sequence according to the ID clock to output a third secondary sub-sequence, and the third secondary sequence sub-circuit gains the third secondary sub-sequence to output a third secondary feedback sub-sequence. The fourth secondary sequence sub-circuit is configured to sample the second secondary sub-sequence according to the data clock to output a fourth secondary sub-sequence, and the fourth secondary sequence sub-circuit gains the fourth secondary sub-sequence to output a fourth secondary feedback sub-sequence. The first arithmetic circuit is configured to compensate the equalization sequence by the first secondary feedback sub-sequence, the second secondary feedback sub-sequence, the third secondary feedback sub-sequence, and the fourth secondary feedback sub-sequence, to output the first added sequence.

In some embodiments, the edge sampling circuit comprises a plurality of edge trigger sampling circuits. The plurality of edge trigger sampling circuits sequentially sample the first added sequence according to the edge clock to output the edge sequence. A number of the plurality of edge trigger sampling circuits is equal to a number of the sequence circuits.

In some embodiments, the first primary sequence sub-circuit comprises a first primary trigger sampling sub-circuit and a first primary gain sub-circuit. The first primary trigger sampling sub-circuit is configured to sample the first added sub-sequence according to the data clock to output the first primary sub-sequence. The first primary gain sub-circuit is configured to gain the first primary sub-sequence by a first primary sub-magnification to output the first primary feedback sub-sequence. The second primary sequence sub-circuit comprises a second primary trigger sampling sub-circuit and a second primary gain sub-circuit. The second primary trigger sampling sub-circuit is configured to sample the second added sub-sequence according to the inverse of the data clock to output the second primary sub-sequence. The second primary gain sub-circuit is configured to gain the second primary sub-sequence by a second primary sub-magnification to output the second primary feedback sub-sequence. The first primary sub-magnification and the second primary sub-magnification each is a constant between −1 and 0.

In some embodiments, each of the trigger sampling circuits is a D-type flip flop. A phase of the data clock substantially differs from a phase of the edge clock by about 90 degrees. Each of the arithmetic circuits is an adder.

In some embodiments, a magnification value of the first secondary sub-magnification at a high level of the inverse of the data clock is different from a magnification value of the first secondary sub-magnification at a low level of the inverse of the data clock. A magnification value of the second secondary sub-magnification at a high level of the data clock is different from a magnification value of the second secondary sub-magnification at a low level of the data clock. A magnification value of the third secondary sub-magnification at the high level of the inverse of the data clock is different from a magnification value of the third secondary sub-magnification at the low level of the inverse of the data clock. A magnification value of the fourth secondary sub-magnification at the high level of the data clock is different from a magnification value of the fourth secondary sub-magnification at the low level of the data clock.

In summary, according to some embodiments, the decision feedback equalizer circuit can remove inter-symbol interference of the equalization sequence on an edge and on data, so that a bit error rate of a clock and data recovery circuit is reduced.

DETAILED DESCRIPTION

Figure 3:
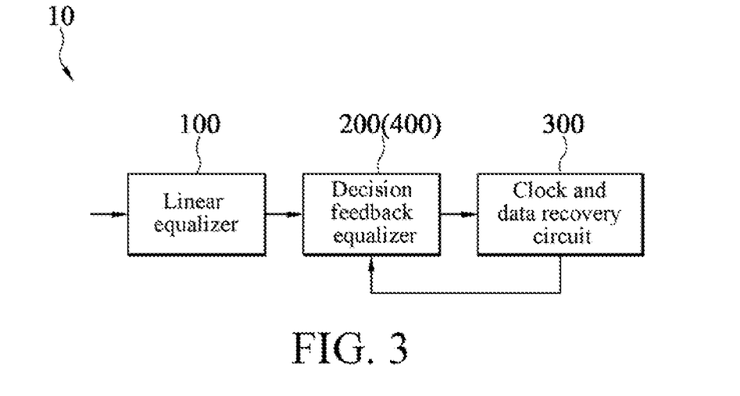
FIG. 3 illustrates a block diagram of a receiver according to an embodiment of the disclosure.

Referring to FIG. 3, FIG. 3 illustrates a block diagram of a receiver 10 according to an embodiment of the disclosure. The receiver 10 comprises a linear equalizer (LEQ) 100, a decision feedback equalizer (DFE) circuit 200, and a clock and data recovery circuit (CDR) 300. In a digital communication system, the receiver 10 receives a sequence from a wireless channel within a bandwidth range. The bandwidth range may be a range in high frequency, such as a frequency above 10 GHz. The sequence is normally affected by inter-symbol interference (ISI) in the wireless channel, and consequently, the sequence (referred to as a distorted sequence) received by the receiver 10 is partly distorted. The linear equalizer 100 is, for example but not limited to, a continuous-time linear equalizer (CTLE). The linear equalizer 100 receives the distorted sequence (an input arrow on a left side of the linear equalizer 100), and amplifies a high frequency component (including noise) in the distorted sequence to generate and output an analog equalization sequence. Next, a decision feedback equalizer circuit 200 receives the analog equalization sequence, converges a distorted amplitude in the analog equalization sequence to a level 0 and a level 1, and samples the converged analog equalization sequence to output a digital equalization sequence with relatively small distortion (which is described in detail later). In some embodiments, the decision feedback equalizer circuit 200 may update a coefficient (which is described in detail later) of the decision feedback equalizer circuit 200 by an algorithm such as a least mean square (LMS) value or zero forcing, thereby converging the distorted amplitude in the analog equalization sequence to the level 0 and the level 1. Subsequently, the clock and data recovery circuit 300 receives a signal output by the decision feedback equalizer circuit 200, and provides the decision feedback equalizer circuit 200 with a data clock Clk1 and an edge clock Clk2 (shown in FIG. 4). The data clock Clk1 and the edge clock Clk2 are used to lock a phase (described in detail later) of the sampled digital equalization sequence.

Figure 4:
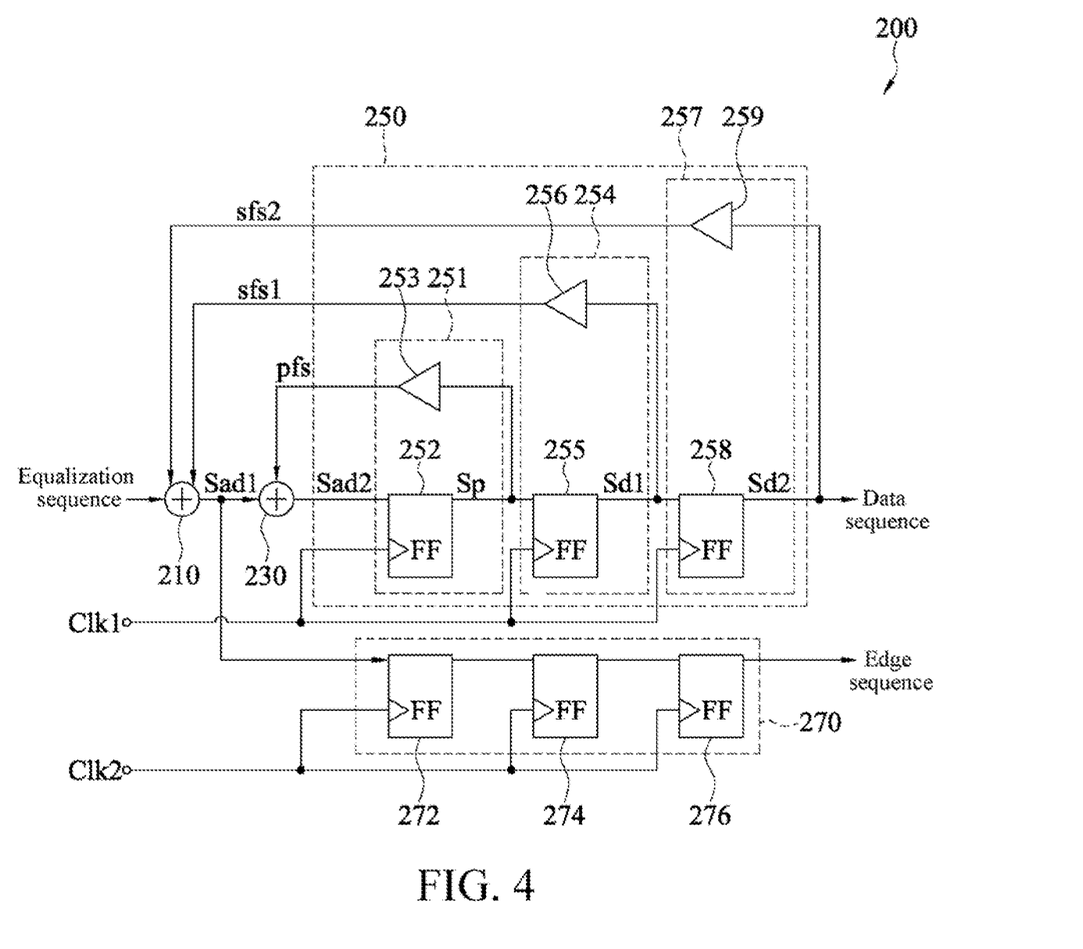
FIG. 4 illustrates a block diagram of some embodiments of a decision feedback equalizer circuit in FIG. 3.
Figure 5A:
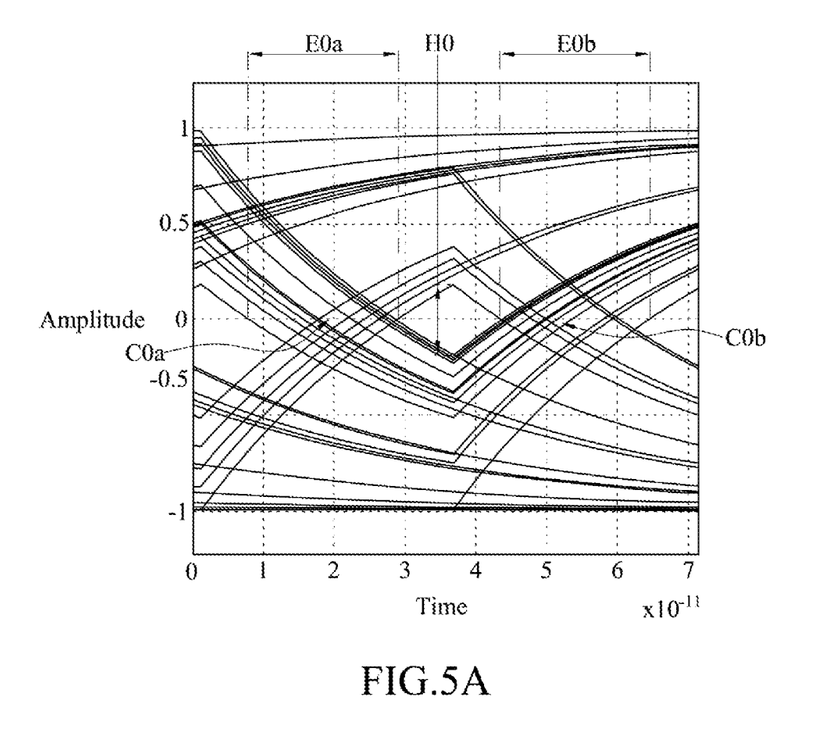
FIG. 5A to FIG. 5C show eye diagrams of an equalization sequence, a first added sequence, and a second added sequence during simulation operation of a decision feedback equalizer circuit in FIG. 4.
Figure 5B:
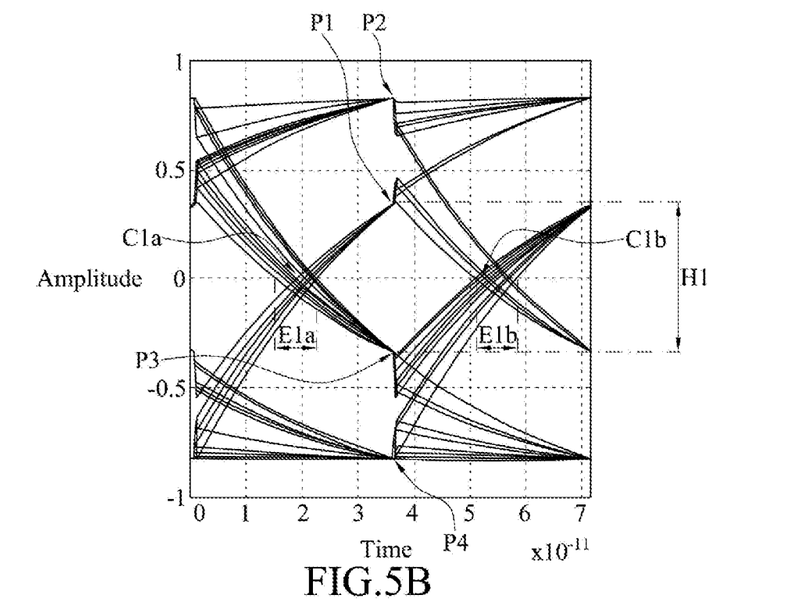
Figure 5C:
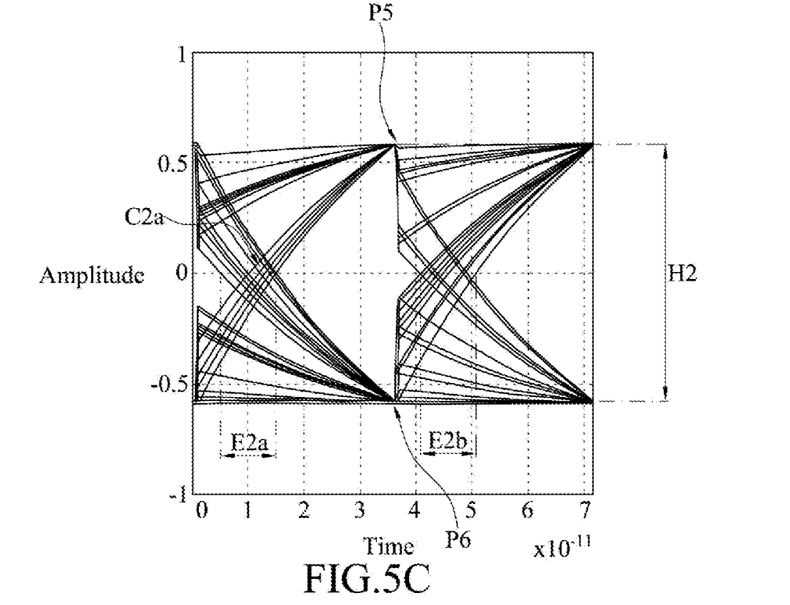

Referring to FIG. 4 and FIG. 5A to FIG. 5C together, FIG. 4 illustrates a block diagram of some embodiments of the decision feedback equalizer circuit 200 in FIG. 3. FIG. 5A illustrates an equalization sequence during simulation operation of the decision feedback equalizer circuit 200 in FIG. 4. FIG. 5B illustrates a first added sequence Sad1 during simulation operation of the decision feedback equalizer circuit 200 in FIG. 4. FIG. 5C illustrates an eye diagram of a second added sequence Sad2 during simulation operation the decision feedback equalizer circuit 200 in FIG. 4. An equalizer circuit of an embodiment of FIG. 4 is the decision feedback equalizer circuit 200. In some embodiments, the decision feedback equalizer circuit 200 is a full rate decision feedback equalizer circuit. Rates of the data clock Clk1, and the edge clock Clk2 are substantially the same, and a phase of the data clock Clk1 substantially differs from a phase of the edge clock Clk2 by about 180 degrees. The decision feedback equalizer circuit 200 comprises a first arithmetic circuit 210, a second arithmetic circuit 230, a data sampling circuit 250, and an edge sampling circuit 270.

The first arithmetic circuit 210 is configured to compensate an equalization sequence (FIG. 5A) from the linear equalizer 100 by a plurality of secondary feedback sequences sfs1, sfs2, to output a first added sequence Sad1. The second arithmetic circuit 230 is configured to compensate the first added sequence Sad1 by a primary feedback sequence pfs to output a second added sequence Sad2. The data sampling circuit 250 comprises a primary sequence circuit 251 and a plurality of secondary sequence circuits 254, 257. The primary sequence circuit 251 is configured to sample the second added sequence Sad2 according to the data clock Clk1 to output a primary sequence Sp, and the primary sequence circuit 251 gains the primary sequence Sp to output the primary feedback sequence pfs. The secondary sequence circuits 254, 257 are configured to sequentially sample the primary sequence Sp according to the data clock Clk1 to output the secondary sequences Sd1, Sd2, and the secondary sequence circuits 254, 257 gain the corresponding secondary sequences Sd1, Sd2 to output the secondary feedback sequences sfs1, sfs2. The edge sampling circuit 270 is configured to sample the first added sequence Sad1 according to the edge clock Clk2 to output an edge sequence.

In some embodiments, the secondary feedback sequences include a first secondary feedback sequence sfs1 and a second secondary feedback sequence sfs2. Therefore, the first arithmetic circuit 210 compensates the equalization sequence by the first secondary feedback sequence sfs1 and the second secondary feedback sequence sfs2 to output the first added sequence Sad1. The first arithmetic circuit 210 is, for example but is not limited to, an adder or a multiplier. In some embodiments, the first arithmetic circuit 210 is an adder. The adder is configured to add up the equalization sequence, the first secondary feedback sequence sfs1, and the second secondary feedback sequence sfs2, to output the first added sequence Sad1. The first secondary feedback sequence sfs1 and the second secondary feedback sequence sfs2 are configured to compensate the equalization sequence.

Referring to FIG. 5A and FIG. 5B, FIG. 5B illustrates an eye diagram of the first added sequence Sad1. According to the comparison between FIG. 5A and FIG. 5B, an amplitude of the first added sequence Sad1 (FIG. 5B) has four convergence points P1, P2, P3, P4. two convergence points P1, P2 are converged to a level 1 (that is, a digit "1"). The two convergence points P1, P2 are located at amplitudes of about 0.4 and 0.7 respectively (at about $3.6 \times 10^{-11}$ on a time (horizontal) axis in the diagram). In addition, another two convergence points P3, P4 are converged to a level 0 (that is, a digit "0"). The another two convergence points P3, P4 are located at amplitudes of about −0.4 and −0.7 Respectively (at about $3.6 \times 10^{-11}$ on the time axis in the diagram) in FIG. 5B. A first eye height (H1) is formed between convergence points (at about $3.6 \times 10^{-11}$ on the time axis in FIG. 5B) of about −0.4 and about 0.4. In an embodiment in which a signal is a differential signal, an amplitude between 0 and 1 is a level 1 (a digit "1"), and an amplitude between 0 and −1 is a level 0 (a digit "0"). Further, according to the comparison between the eye diagram of the equalization sequence (shown in FIG. 5A) and the eye diagram of the first added sequence Sad1 (shown in FIG. 5B), an eye height (H0) of the equalization sequence (FIG. 5A) is between about −0.25 and +0.25 (at about $3.7 \times 10^{-11}$ on the time axis). That is, the first eye height (H1) of the first added sequence Sad1 is higher than the eye height (H0) of the equalization sequence (FIG. 5A). It indicates that the first arithmetic circuit 210 compensates the equalization sequence by the first secondary feedback sequence sfs1 and the second secondary feedback sequence sfs2 to obtain the first added sequence Sad1. The obtained first added sequence Sad1 has an increased eye height (than that of the equalization sequence). An eye height increase can reduce the bit error rate. Accordingly, the subsequent clock and data recovery circuit 300 can recover the clock and data more correctly.

Next, accord to the comparison between FIG. 5A and FIG. 5B, signal traces of the equalization sequence (FIG. 5A) at an edge (that is, on an horizontal axis with an amplitude of zero and near about $2 \times 10^{-11}$ (C0a) and near about $5.2 \times 10^{-11}$ (C0b) on the time axis in FIG. 5A) are dispersed (zero-crossing points of signals has a large width E0a, E0b, zero-crossing points of signals means points that signals cross the horizontal axis with an amplitude of zero). Center of an edge of the first added sequence Sad1 (FIG. 5B) is similar to that in FIG. 5A, which is near $2 \times 10^{-11}$ (C1a) and $5.2 \times 10^{-11}$ (C1b) on the time axis. However, time differences (E1a, E1b) between signals of the first added sequence Sad1 at an amplitude of zero is relatively much smaller than that (E0a, E0b) of the equalization sequence (FIG. 5A). It is obvious that the first added sequence Sad1 has a convergence effect on the edge (From E0a, E0b to E1a, E1b). Therefore, the first added sequence Sad1 used as an input of the edge sampling circuit 270 effectively reduces the bit error rate when the edge sampling circuit 270 samples edges.

Still referring to FIG. 4, the second arithmetic circuit 230 is configured to compensate the first added sequence Sad1 by a primary feedback sequence pfs to output the second added sequence Sad2. The second arithmetic circuit 230 is, for example but is not limited to, an adder or a multiplier. In some embodiments, the second arithmetic circuit 230 is an adder configured to add up the first added sequence Sad1 and the primary feedback sequence pfs, to output the second added sequence Sad2. Referring to the eye diagram of the second added sequence Sad2 (shown in FIG. 5C), an amplitude of the second added sequence Sad2 has two convergence points P5, P6: a level 1 and a level 0 (that is, locations with amplitudes of about 0.5 and −0.5). In other words, the four convergence points P1, P2, P3, P4 of the first added sequence Sad1 are converged to the two convergence points P5, P6 after the first added sequence Sad1 is compensated by the primary feedback sequence pfs. A second eye height H2 is between the two convergence points. According to FIG. 5B and FIG. 5C, the second eye height H2 (between −0.5 and 0.5, FIG. 5C) is higher than the first eye height H1 (between −0.25 and 0.25) of the first added sequence Sad1 (FIG. 5B). Hence, the second arithmetic circuit 230 compensates the first added sequence Sad1 by the primary feedback sequence pfs to obtain the second added sequence Sad2. The amplitudes of the levels 0 and 1 (0 and 1 of a digital signal) of the second added sequence Sad2 are respectively converged on locations of about −0.5 and 0.5. This creates equalization effect. Inter-symbol interference of the first added sequence Sad1 is removed considerably. Therefore, the bit error rate of the data sampling circuit 250 (sampling the second added sequence Sad2) is effectively reduced. According to the comparison between FIG. 5B and FIG. 5C, a center (C2a at about $1.1 \times 10^{-11}$) of the amplitude of the second added sequence Sad2 in FIG. 5C at zero-crossing locations is significantly earlier than a center (C0a at about $2 \times 10^{-11}$) of zero-crossing locations in FIG. 5A. Time difference (E2a, E2b) between amplitudes of signals of the second added sequence Sad2 is larger than that (E1a, E1b) of the first added sequence Sad1 in FIG. 5B.

Referring to FIG. 4 again, in some embodiments, the data sampling circuit 250 comprises a primary sequence circuit 251, a first secondary sequence circuit 254, and a second secondary sequence circuit 257. The primary sequence circuit 251 is configured to receive the second added sequence Sad2 according to the data clock Clk1 to output a primary sequence Sp accordingly, and the primary sequence circuit 251 gains the primary sequence Sp to output the primary feedback sequence pfs. The first secondary sequence circuit 254 is configured to receive the primary sequence Sp according to the data clock Clk1 to output a first secondary sequence Sd1 accordingly, and the first secondary sequence circuit 254 gains the first secondary sequence Sd1 to output the first secondary feedback sequence sfs1. The second secondary sequence circuit 257 is configured to receive the first secondary sequence Sd1 according to the data clock Clk1 to output a second secondary sequence Sd2 (the second secondary sequence Sd2 is a data sequence in FIG. 4), and the second secondary sequence circuit 257 gains the second secondary sequence Sd2 to output the second secondary feedback sequence sfs2. Therefore, that "the secondary sequence circuits 254, 257 sequentially sample the primary sequence Sp according to the data clock Clk1 to output a plurality of secondary sequences" means that the first secondary sequence circuit 254 samples the primary sequence Sp to output the first secondary sequence Sd1 and the second secondary sequence circuit 257 samples the first secondary sequence Sd1 to output the second secondary sequence Sd2.

In some embodiments, the primary sequence circuit 251 comprises a trigger sampling circuit 252 (a primary trigger sampling circuit) and a gain circuit 253 (a primary gain circuit). The trigger sampling circuit 252 is a component that samples input data according to a trigger of a clock to output the sampling result until a next trigger. The trigger of the clock may be a trigger of a rising edge of the clock or a trigger of a falling edge of the clock. The trigger sampling circuit 252 samples the input data to determine whether a level of the sampled data at the trigger time point belongs to a level "0" or "1", and outputs the determined level "0" or "1" as the sampling result. In FIG. 4, the trigger sampling circuit 252 samples the second added sequence Sad2 according to the data clock Clk1 (for example but not limited to the trigger of a rising edge of the data clock Clk1), and outputs a sampling result as the primary sequence Sp. In some embodiments, the trigger sampling circuit 252 is a flip flop, and the flip flop is, for example, but not limited to a D-type flip flop. The D-type flip flop has a sequence input terminal, a clock input terminal, and a sequence output terminal. The D-type flip flop receives the data clock Clk1 via the clock input terminal, determines, according to the trigger of the data clock Clk1, a level of the second added sequence Sad2 received from the sequence input terminal, and outputs the level of the second added sequence Sad2 at the trigger time point from the sequence output terminal. Next, the D-type flip flop maintains the outputted level until a next trigger of the data clock Clk1. Therefore, the D-type flip flop has a storage and delay function. The gain circuit 253 is, for example but not limited to, an amplification circuit, an inverse circuit, or the combination of an amplification and inverse circuit. The gain circuit 253 is for gaining an input signal to output a gained signal. In some embodiments, the gain circuit 253 gains the input primary sequence Sp by a factor of a primary magnification to output the primary feedback sequence pfs. Specifically, the gain circuit gains a voltage (or a current) of the primary sequence Sp by a factor of the primary magnification, and then output as the primary feedback sequence pfs. In some embodiments, the gain circuit may also have a buffering effect, and the primary magnification may be a constant between −1 and 1, such as −0.5, −0.3, −0.1, 0.2, 0.4, etc. The primary magnification may be adjusted according to a characteristics of the first added sequence Sad1, which is described later.

In some embodiments, the first secondary sequence circuit 254 comprises a trigger sampling circuit 255 (a first secondary trigger sampling circuit) and a gain circuit 256 (a first secondary gain circuit). The trigger sampling circuit 255 samples the primary sequence Sp according to the trigger of the data clock Clk1 to output first secondary sequence Sd1 as a sampling result. In some embodiments, the trigger sampling circuit 256 is a D-type flip flop. The gain circuit 256 gains the input primary sequence Sp by a factor of a first magnification to output the first secondary feedback sequence sfs1. The first magnification may be a constant between −1 and 1, such as −0.5, −0.3, −0.1, 0.2, 0.4, etc. The first magnification may be adjusted according to characteristics of the equalization sequence and the first primary sequence Sp, which is described later.

The second secondary sequence circuit 257 comprises a trigger sampling circuit 258 (a second secondary trigger sampling circuit) and a gain circuit 259 (a second secondary gain circuit). The trigger sampling circuit 258 samples the first secondary sequence Sd1 according to the trigger of the data clock Clk1 to output the second secondary sequence Sd2 as a sampling result. In some embodiments, the trigger sampling circuit 258 is a D-type flip flop. The gain circuit 259 gains the input first secondary sequence Sd1 by a factor of a second magnification to output the second secondary feedback sequence sfs2. The second magnification may be a constant between −1 and 1, such as −0.5, −0.3, −0.1, 0.2, 0.4, etc. The second magnification may be adjusted according to characteristics of the equalization sequence, the primary sequence Sp, and the first secondary sequence Sd1, which is described later.

The edge sampling circuit 270 is configured to sample the first added sequence Sad1 according to the edge clock Clk2 to output the edge sequence. In some embodiments, a phase of the edge clock Clk2 differs from a phase of the edge clock Clk1 by about 180 degrees. The edge sampling circuit 270 comprises a plurality of trigger sampling circuits 272, 274, 276 (also referred to as edge trigger sampling circuits to be distinguished from the trigger sampling circuit of the data sampling circuit 250) sequentially connected in series, and the trigger sampling circuits 272, 274, 276 connected in series sequentially sample the first added sequence Sad1 according to the edge clock Clk2 to output the edge sequence. Said "sequentially sample" means that each of the trigger sampling circuits 272, 274, 276 samples an output of a previous-stage component thereof, and then outputs a sampling result. In some embodiments, the trigger sampling circuits 272, 274, 276 are D-type flip flops. When each flip flop is triggered by the edge clock Clk2 (which may be triggered by a rising edge or a falling edge of the edge clock Clk2), a signal input to the flip flop is sampled, and a level of the sampled signal is used as an output of the flip flop. For example, said "sequentially sample" means that the trigger sampling circuit 272 determines, when being triggered by the edge clock Clk2, a level of the first added sequence Sad1 and outputs the determined level as an output signal (also referred to as a sampling result) of the trigger sampling circuit 272. The trigger sampling circuit 272 maintains the output signal until a next trigger of the edge clock Clk2. Likewise, the trigger sampling circuit 274 determines a level of the output signal of the trigger sampling circuit 272 when being triggered by the edge clock Clk2, and outputs the determined level as an output signal of the trigger sampling circuit 274. The trigger sampling circuit 274 maintains the output signal until a next trigger of the edge clock Clk2. The trigger sampling circuit 276 determines a level of the output signal of the trigger sampling circuit 274 when being triggered by the edge clock Clk2, and outputs the determined level as an output signal of the trigger sampling circuit 276. The trigger sampling circuit 276 maintains the output signal until next a trigger of the edge clock Clk2. The trigger sampling circuit 276 is the last stage in the trigger sampling circuits connected in series, and therefore an output (a sampling result) of the trigger sampling circuit 276 is the foregoing edge sequence. A number of the edge trigger sampling circuits 272, 274, 276 is equal to a number of the sequence circuits 251, 254, 257.

Figure 6:
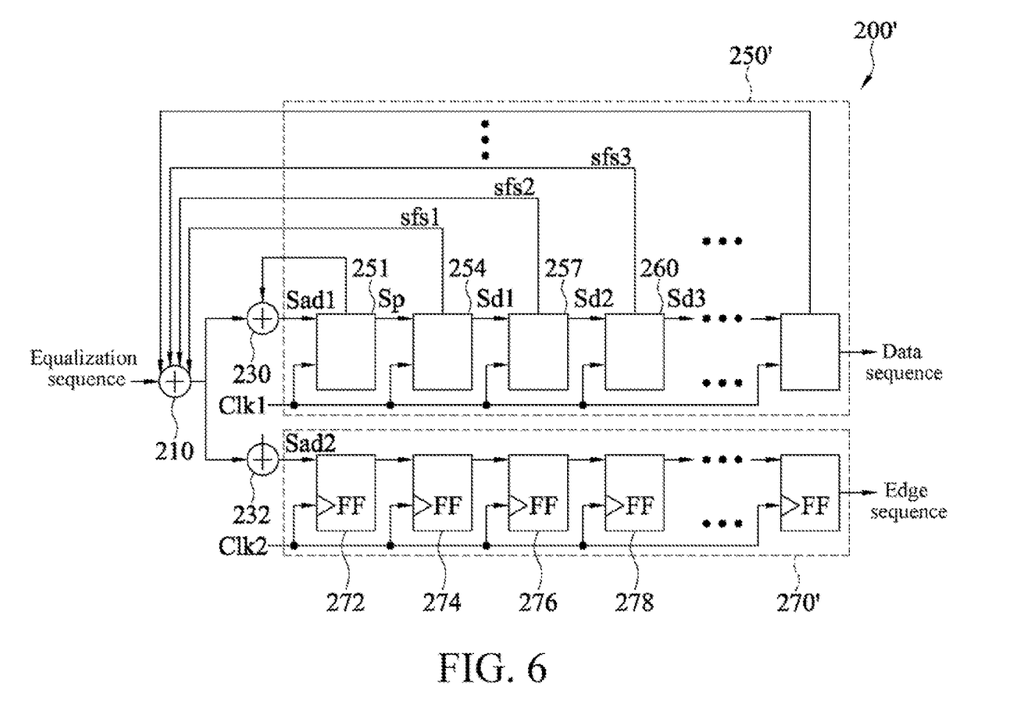
FIG. 6 illustrates a block diagram of some embodiments of a decision feedback equalizer circuit in FIG. 3.

In some embodiments, the equalizer circuit 200 has a dummy arithmetic circuit (such as a component of a number 232 in FIG. 6). The dummy arithmetic circuit is located between the edge sampling circuit 270 and the first arithmetic circuit 210. A delay time of the dummy arithmetic circuit is substantially the same as a delay time of the second arithmetic circuit 230, and the dummy arithmetic circuit receives the first added sequence Sad1 and directly outputs the first added sequence Sad1. With the configuration of the dummy arithmetic circuit, a time for the first added sequence Sad1 to pass through the data sampling circuit 250 and to be output as a data sequence is substantially equal to a time for the first added sequence Sad1 to pass through the edge sampling circuit 270 and to be output as an edge sequence.

The following briefly describes the operation that the first arithmetic circuit 210 and the second arithmetic circuit 230 respectively compensate the equalization sequence and the feedback sequences pfs, sfs1, sfs2 of the first added sequence Sad1. In digital signal communication, transmitted data is data of levels 0 and 1. Taking transmission of 10 bits as an example, transmitted content is, for example, 0101101010 (referred to as a "former-sequence" below) or 1000000010 (referred to as a "latter-sequence" below). There is only one "0" in front of the last "1" of the former-sequence and seven "0"s in front of the last "1" of the latter-sequence. Assuming that both the former-sequence and the latter-sequence are transmitted by a same transmission device, based on characteristics of the transmission component and the transmission channel of the transmission device, the rising time and a falling time of the last "1" of the latter-sequence are longer than the rising time and the falling time of the last "1" of the former-sequence. The amplitude of the last "1" of the latter-sequence is smaller than the amplitude of the last "1" of the former-sequence. Content that influences the rising time, the falling time, and the amplitude most greatly is content of the first bit in front of the last "1", and content that has second largest influence is content of the second bit in front of the last 1, and so on. The former-sequence and the latter-sequence are used as an example. If a current bit is the ninth bit, a first bit in front of the current bit is the eighth bit, a second bit in front of the current bit is the seventh bit, and so on. The eighth bit influences the current bit (the ninth bit) most greatly, followed by the seventh bit, and so on. Therefore, in some embodiments, when a feedback signal of the current bit (the ninth bit) is selected to be compensated, a weight (a gain value, magnification) of the eighth bit is higher than that of the seventh bit, and a compensated weight of the seventh bit is higher than that of the sixth bit.

Referring to FIG. 4 again, the 10-bit sequence in the foregoing example is used for description. The data sampling circuit 250 performs data sampling on the former-sequence according to the trigger of the data clock Clk1. A bit before the primary sequence circuit 251 is the ninth bit (referred to as a current bit below), an output of the primary sequence circuit 251 is the eighth bit, an output of the first secondary sequence circuit 254 is the seventh bit, and an output of the second secondary sequence circuit 257 is the sixth bit. Because the eighth, seventh, and sixth bits have different influence on a characteristic of the current bit, the magnifications for the primary sequence circuit 251, first secondary sequence circuit 254, and the second secondary sequence circuit 257 are different. Specifically, the foregoing primary magnification, first magnification, and second magnification are different. In addition, in an application with inter-symbol interference, levels of the eighth bit, the seventh bit, and the sixth bit have an inverse effect on a level of the current bit. Therefore, in some embodiments, the first, second, and third magnifications are negative values. The magnifications may be obtained by an additional circuit or obtained by algorithm through convergence. For example, the first, second, and third magnifications are obtained by the foregoing least mean square value algorithm, and the magnifications are constants between −1 and 0.

Moreover, according to the comparison between the first added sequence Sad1 in FIG. 5B and the second added sequence Sad2 in FIG. 5C. After the first added sequence Sad1 is compensated by the primary feedback sequence pfs, an amplitude of the obtained second added sequence Sad2 has a good equalization effect, so that a bit error rate of data sampling of the second added sequence Sad2 is reduced (a sampling time point is about $3.5 \times 10^{-11}$). However, a bit error rate of edge sampling of the output second added sequence Sad2 is still high (sampling is performed in a middle section of a time about 0 to $3.5 \times 10^{-11}$). Furthermore, after the equalization sequence is compensated by the first secondary feedback sequence and the second secondary feedback sequence sfs1, sfs2, a bit error rate of edge sampling of the equalization sequence can be effectively reduced. Therefore, an input of the edge sampling circuit 270 is the first added sequence Sad1. As discussed above, in the embodiment of FIG. 4, after the clock and data recovery circuit 300 receives the data sequence and the edge sequence, bit error rates of sampling the sequences can be effectively reduced. According to the comparison among FIG. 5A, FIG. 5B, and FIG. 5C, feedback of the primary feedback sequence pfs makes an edge (at a level with an amplitude of zero) of an input sequence earlier. However, for data sampling, better equalization and effective data sampling with a low error rate can be obtained, so that the second added sequence Sad2 is used as an input of the data sampling circuit 250.

Referring to FIG. 6, FIG. 6 illustrates a block diagram of an embodiment of the decision feedback equalizer circuit 200 of FIG. 3. A equalizer circuit 200' comprises a first arithmetic circuit 210, a second arithmetic circuit 230, a dummy arithmetic circuit 232, a data sampling circuit 250', and an edge sampling circuit 270'. The data sampling circuit 250' comprises a primary sequence circuit 251, a first secondary sequence circuit 254, a second secondary sequence circuit 257, and a third secondary sequence circuit 260. The third secondary sequence circuit 260 receives the second secondary sequence Sd2, and samples the second secondary sequence Sd2 according to the data clock Clk1 to output the data sequence. The edge sampling circuit 270' comprises a plurality of trigger sampling circuits 272, 274, 276, 278 connected in series. A number of the trigger sampling circuits 272, 274, 276, 278 of the edge sampling circuit 270' is the same as a number of the primary sequence circuit 251 and the secondary sequence circuits 254, 257, 260 of the data sampling circuit 250'.

In some embodiments, the data sampling circuit 250 comprises a plurality of third secondary sequence circuits 260. The third secondary sequence circuits 260 are sequentially configured in series between the second secondary sequence circuit 257 and the data sequence. In other words, the third secondary sequence circuits 260 connected in series receive the second secondary sequence Sd2, and sequentially sample the second secondary sequence Sd2 according to the data clock Clk1 to output the data sequence. Each of the third secondary sequence circuits 260 samples (that is, stores and delays), according to the data clock Clk1, a sequence input by a previous stage, to output a sampling result accordingly. Each of the third secondary sequence circuits 260 gains a corresponding sampling result to output a plurality of third secondary feedback sequences sfs3 correspondingly. The first arithmetic circuit 210 compensate the equalization sequence by the third secondary feedback sequences sfs3 and the first secondary feedback sequence sfs1 and the second secondary feedback sequence sfs2, to output the first added sequence Sad1. The first added sequence Sad1 is used as an input of the edge sampling circuit 270 to better reduce the bit error rate of edge sampling. In this embodiment, a sampling result outputted by the last stage of the third secondary sequence circuits 260 connected in series is the data sequence.

The decision feedback equalizer circuit 200 in the embodiments of FIG. 4 and FIG. 6 is a full rate decision feedback equalizer circuit, that is, the rates of the data clock Clk1 and the edge clock Clk2 is substantially the same as a rate of the data sequence. In some embodiments, the decision feedback equalizer circuit 200 may also be a half rate decision feedback equalizer circuit.

Figure 7:
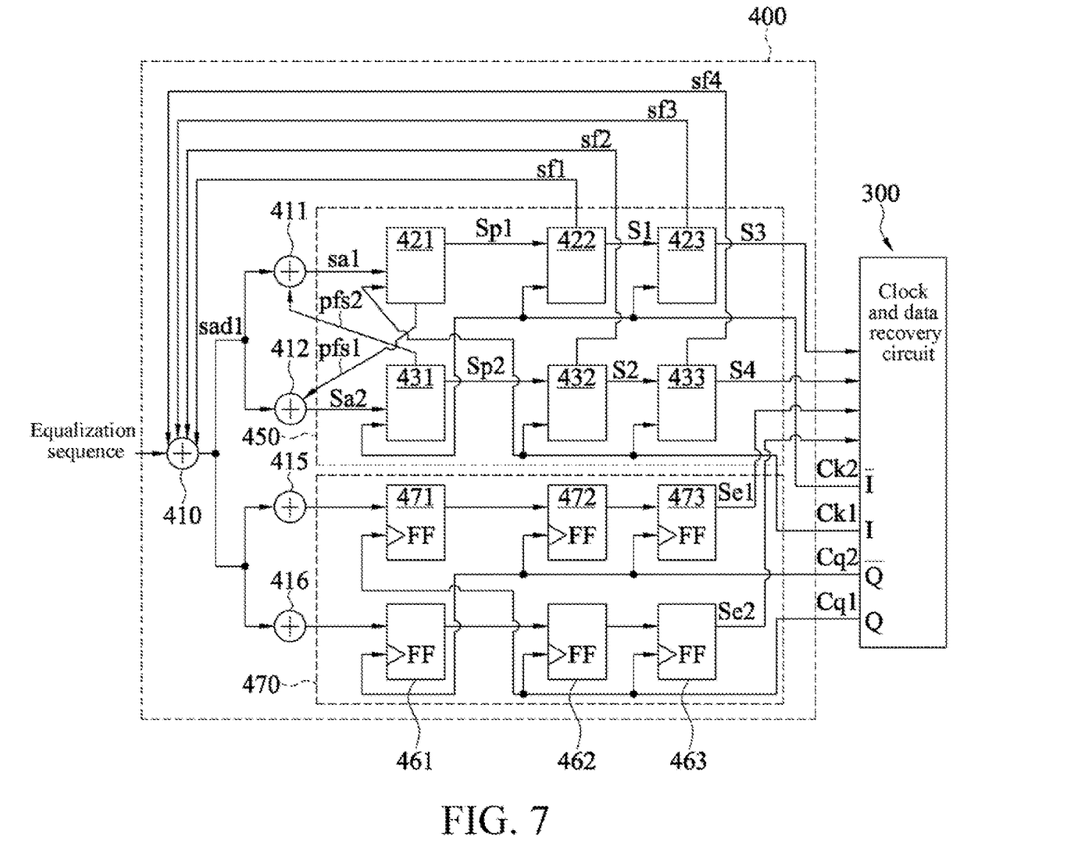
FIG. 7 illustrates a block diagram of some embodiments of a decision feedback equalizer circuit in FIG. 3.

Referring to FIG. 7, FIG. 7 illustrates a block diagram of some embodiments of the decision feedback equalizer circuit in FIG. 3. In this embodiment, a decision feedback equalizer circuit 400 is a half rate decision equalizer circuit, that is, rates of data clocks Ck1, Ck2 for triggering a data sampling circuit 450 and rates of edge clocks Cq1, Cq2 for triggering an edge sampling circuit 470 are half of a rate of the equalization sequence. In some embodiments, the data clocks Ck1, Ck2 and the edge clocks Cq1, Cq2 are output by the clock and data recovery circuit 300. The decision feedback equalizer circuit 400 comprises a first arithmetic circuit 410, a second arithmetic circuit, a data sampling circuit 450, and an edge sampling circuit 470.

The first arithmetic circuit 410 is configured to compensate the equalization sequence by a plurality of secondary feedback sequences sf1, sf2, sf3, sf4 to output a first added sequence Sad1. The second arithmetic circuit is configured to compensate the first added sequence Sad1 by a primary feedback sequence to output a second added sequence Sad2 (that is the Sa1 and the Sa2 in FIG. 7). The data sampling circuit 450 comprises a primary sequence circuit and a plurality of secondary sequence circuits. The primary sequence circuit is configured to sample the second added sequence Sad2 according to the data clock Ck1 to output a primary sequence, and the primary sequence circuit gains the primary sequence to output the primary feedback sequence. The secondary sequence circuits are configured to sequentially sample the primary sequence according to the data clock Ck1 to output a plurality of secondary sequences, and the secondary sequence circuits gain the corresponding secondary sequences to output the secondary feedback sequences sf1, sf2, sf3, sf4. The edge sampling circuit 470 is configured to sequentially sample the first added sequence Sad1 according to the edge clock Cq2 to output an edge sequence.

In some embodiments, the rate of the equalization sequence is substantially twice a rate of the data clock, and the rate of the equalization sequence is substantially twice a rate of the edge clock. The primary feedback sequence comprises a first primary feedback sub-sequence pfs1 and a second primary feedback sub-sequence pfs2, and the second added sequence Sad2 comprises a first added sub-sequence Sa1 and a second added sub-sequence Sa2.

The second arithmetic circuit comprises a first arithmetic sub-circuit 411 and a second arithmetic sub-circuit 412. The first arithmetic sub-circuit 411 is configured to compensate the first added sequence Sad1 by the first primary feedback sub-sequence pfs1 to output the first added sub-sequence Sa1. The second arithmetic sub-circuit 412 is configured to compensate the first added sequence Sad1 by the second primary feedback sub-sequence pfs2 to output the second added sub-sequence Sa2.

The primary sequence circuit comprises a first primary sequence sub-circuit 421 and a second primary sequence sub-circuit 431. The first primary sequence sub-circuit 421 is configured to sample the first added sub-sequence Sa1 according to the data clock Ck1 to output a first primary sub-sequence Sp1, and the first primary sequence sub-circuit 421 gains the first primary sub-sequence Sp1 to output the first primary feedback sub-sequence pfs1. The second primary sequence sub-circuit 431 is configured to sample the second added sub-sequence Sa2 according to an inverse of the data clock Ck1 (the inverse of the data clock is referred to as an inverse data clock Ck2, ID clock Ck2) to output a second primary sub-sequence Sp2, and the second primary sequence sub-circuit 431 gains the second primary sub-sequence Sp2 to output the second primary feedback sub-sequence pfs2.

The data sampling circuit comprises four of the secondary sequence circuits. The four secondary sequence circuits comprises a first secondary sequence sub-circuit 422, a second secondary sequence sub-circuit 432, a third secondary sequence sub-circuit 423, and a fourth secondary sequence sub-circuit 433.

The first secondary sequence sub-circuit 422 is configured to sample the first primary sub-sequence Sp1 according to the ID clock Ck2 to output a first secondary sub-sequence S1, and the first secondary sequence sub-circuit 422 gains the first secondary sub-sequence S1 to output a first secondary feedback sub-sequence sf1.

The second secondary sequence sub-circuit 432 is configured to sample the second primary sub-sequence Sp2 according to the data clock Ck1 to output a second secondary sub-sequence S2, and the second secondary sequence sub-circuit 432 gains the second secondary sub-sequence S2 to output a second secondary feedback sub-sequence sf2.

The third secondary sequence sub-circuit 423 is configured to sample the first secondary sub-sequence S1 according to the ID clock Ck2 to output a third secondary sub-sequence S3, and the third secondary sequence sub-circuit 423 gains the third secondary sub-sequence S3 to output a third secondary feedback sub-sequence sf3.

The fourth secondary sequence sub-circuit 433 is configured to sample the second secondary sub-sequence S2 according to the data clock Ck1 to output a fourth secondary sub-sequence S4, and the fourth secondary sequence sub-circuit 433 gains the fourth secondary sub-sequence S4 to output a fourth secondary feedback sub-sequence sf4.

The first arithmetic circuit is configured to compensate the equalization sequence by the first secondary feedback sub-sequence Sf1, the second secondary feedback sub-sequence Sf2, the third secondary feedback sub-sequence Sf3, and the fourth secondary feedback sub-sequences Sf4, to output the first added sequence Sad1.

In some embodiments, detailed structures of the foregoing sequence circuits 421, 422, 423, 431, 432, 433 are shown in FIG. 4, and each of the sequence circuits 421, 422, 423, 431, 432, 433 comprises a trigger sampling circuit and a gain circuit, which are separately described below.

The first primary sequence sub-circuit 421 comprises a first primary trigger sampling sub-circuit and a first primary gain sub-circuit. The first primary trigger sampling sub-circuit is configured to sample the first added sub-sequence Sa1 according to the data clock Ck1 to output the first primary sequence sub-Sp1. The first primary gain sub-circuit is configured to gain the first primary sub-sequence Sp1 by a factor of a first primary sub-magnification to output the first primary feedback sub-sequence pfs1.

The second primary sequence sub-circuit 431 comprises a second primary trigger sampling sub-circuit and a second primary gain sub-circuit. The second primary trigger sampling sub-circuit is configured to sample the second added sub-sequence Sa2 according to the ID clock Ck2 to output the second primary sub-sequence Sp2. The second primary gain sub-circuit is configured to gain the second primary sub-sequence Sp2 by a factor of a second primary sub-magnification to output the second primary feedback sub-sequence pfs2. The first primary sub-magnification and the second primary sub-magnification each is a constant between −1 and 0.

The first secondary sequence circuit 422 comprises a first secondary trigger sampling sub-circuit and a first secondary gain sub-circuit. The first secondary trigger sampling sub-circuit is configured to sample the first primary sub-sequence Sp1 according to the ID clock Ck2 to output the first secondary sub-sequence S1. The first secondary gain sub-circuit is configured to gain the first secondary sub-sequence S1 by a factor of a first secondary sub-magnification to output the first secondary feedback sub-sequence sf1. The second secondary sequence sub-circuit 432 comprises a second secondary trigger sampling sub-circuit and a second secondary gain sub-circuit. The second secondary trigger sampling sub-circuit is configured to sample the second primary sub-sequence Sp2 according to the data clock Ck1 to output the second secondary sub-sequence S2. The second secondary gain sub-circuit is configured to gain the second secondary sub-sequence S2 by a factor of a second secondary sub-magnification to output the second secondary feedback sub-sequence sf2.

The third secondary sequence sub-circuit 423 comprises a third secondary trigger sampling sub-circuit and a third secondary gain sub-circuit. The third secondary trigger sampling sub-circuit is configured to sample the first secondary sub-sequence S1 according to the ID clock Ck2 to output the third secondary sub-sequence S3. The third secondary gain sub-circuit is configured to gain the third secondary sequence S3 by a factor of a third secondary sub-magnification to output the third secondary feedback sub-sequence sf3. The fourth secondary sequence sub-circuit 433 comprises a fourth secondary trigger sampling sub-circuit and a fourth secondary gain sub-circuit. The fourth secondary trigger sampling sub-circuit is configured to sample the second primary sub-sequence Sp2 according to the data clock Ck1 to output the fourth secondary sub-sequence S4. The fourth secondary gain sub-circuit is configured to gain the fourth secondary sub-sequence S4 by a factor of a fourth secondary sub-magnification to output the fourth secondary feedback sub-sequence sf4. The first secondary sub-magnification, the second secondary sub-magnification, the third secondary sub-magnification, and the fourth secondary sub-magnification each is a constant between −1 and 0.

The third secondary sub-sequence S3 and the fourth secondary sub-sequence S4 are data sequences output by the data sampling circuit 450 to the clock and data recovery circuit 300. The clock and data recovery circuit 300 may integrate and recover the third secondary sub-sequence S3 and the fourth secondary sub-sequence S4. Alternatively, the clock and data recovery circuit 300 may reduce frequency of the third secondary sub-sequence S3 and the fourth secondary sub-sequence S4 and then integrate and recover the frequency-reduced the third secondary sub-sequence S3 and the fourth secondary sub-sequence S4.

In some embodiments, a magnification value of the first secondary sub-magnification at a high level of the ID clock Ck2 is different from a magnification value of the first secondary sub-magnification at a low level of the ID clock Ck2. A magnification value of the second secondary sub-magnification at a high level of the data clock Ck1 is different from a magnification value of the second secondary sub-magnification at a low level of the data clock Ck1. A magnification value of the third secondary sub-magnification at a high level of the ID clock Ck2 is different from a magnification value of the third secondary sub-magnification at a low level of the ID clock Ck2. A magnification value of the fourth secondary sub-magnification at a high level of the data clock Ck1 is different from a magnification value of the fourth secondary sub-magnification at a low level of the data clock Ck1. In other words, the sub-magnifications each has a configuration of two magnification values, which is described later.

In some embodiments, each of the trigger sampling circuits is a D-type flip flop, and a phase of the data clock Ck1 substantially differs from a phase of the edge clock Cq1 by about 90 degrees. Each of the arithmetic circuits is an adder.

Figure 8:
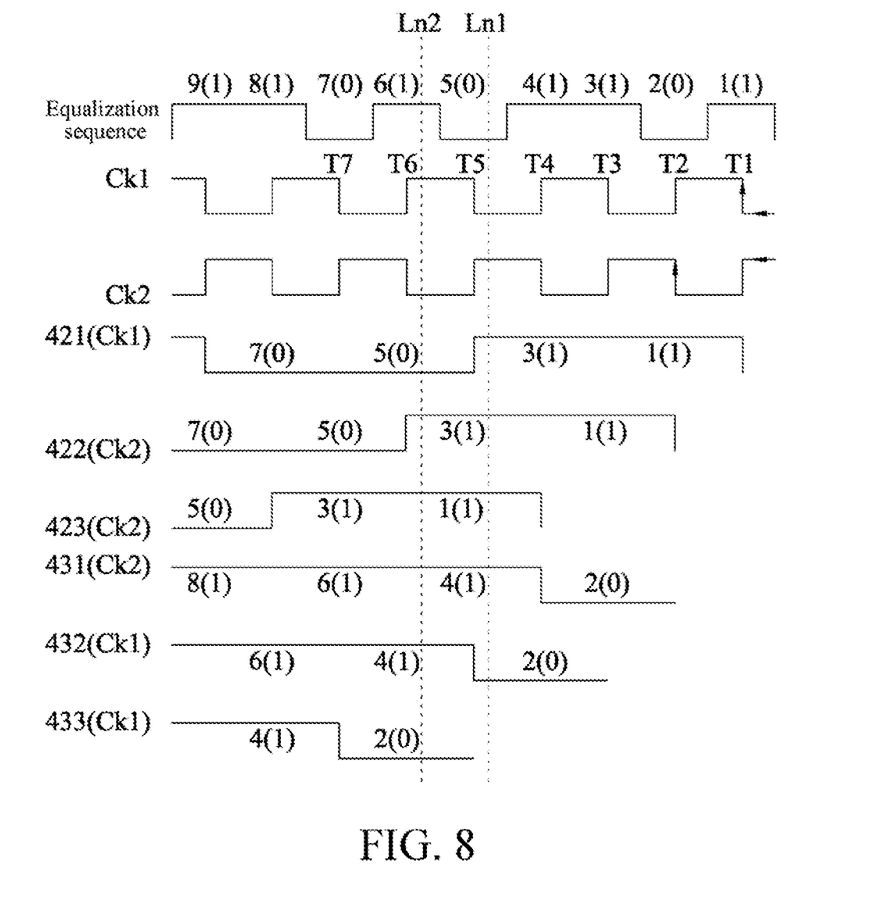
FIG. 8 illustrates a timing diagram of a decision feedback equalizer circuit in FIG. 7.

Regarding operation of the equalizer circuit 400 in FIG. 7, refer to FIG. 8. FIG. 8 illustrates a timing diagram of the decision feedback equalizer circuit in FIG. 7. Content of an equalization sequence in FIG. 8 is, for example, 1 1010 1101. The mark 1(1) indicates a first bit transmitted to the first arithmetic circuit 410, where the content is a number "1". A mark 2(0) indicates a second bit transmitted to the first arithmetic circuit 410, where the content is a number "0". A mark 3(1) indicates a third bit transmitted to the first arithmetic circuit 410, where content is the number "1". In other words, a horizontal line in FIG. 8 is a time axis, and The rightmost bit 1(1) on the horizontal axis is a bit transmitted to the data sampling circuit 450 and the edge sampling circuit 470 earliest. The leftmost bit 9(1) on the horizontal axis is a bit transmitted to the data sampling circuit 450 and the edge sampling circuit 470 latest. In FIG. 8, the rising edges of the data clock Ck1 is in the middle of the first bit, the third bit, the fifth bit, the seventh bit, and the ninth bit. The rising edge bit of the ID clock Ck2 is in the middle of the second bit, the fourth bit, the sixth bit, and the eighth bit. The first primary sequence sub-circuit 421, the second secondary sequence sub-circuit 432, and the fourth secondary sequence sub-circuit 433 are triggered by the rising edges of the data clock Ck1. The second primary sequence sub-circuit 431, the first secondary sequence sub-circuit 422, and the third secondary sequence sub-circuit 423 are triggered by the rising edges of the ID clock Ck2.

According to the timing diagram, at the first trigger time T1 (Ck1), the first primary sequence sub-circuit 421 performs sampling to obtain and maintain 1(1). At a second trigger time T2 (Ck2), the first secondary sequence sub-circuit 422 performs sampling to obtain and maintain 1(1), and the second primary sequence sub-circuit 431 obtains and maintains 2(0). At a third trigger time T3 (Ck1), the first secondary sequence sub-circuit 421 performs sampling to obtain and maintain 3(1), and the second secondary sequence sub-circuit 432 performs sampling to obtain and maintain 2(0). At a fourth trigger time T4 (Ck2), the first secondary sequence sub-circuit 422 performs sampling to obtain and maintain 3(1), the third secondary sequence sub-circuit 423 performs sampling to obtain and maintain 1(1), and the second secondary sequence sub-circuit 431 obtains and maintains 4(1). Therefore, before a fifth trigger time T5 (that is, a time point Ln1), the first primary sequence sub-circuit 421 maintains 3(1), the second primary sequence sub-circuit 431 maintains 4(1), the first secondary sequence sub-circuit 422 maintains 3(1), the second secondary sequence sub-circuit 432 maintains 2(0), and the third secondary sequence sub-circuit 423 maintains 1(1), but the fourth secondary sequence sub-circuit 433 has not sampled data of the equalization sequence.

At the fifth trigger time T5 (Ck1), the first primary sequence sub-circuit 421 performs sampling to obtain and maintain 5(0), the second secondary sequence sub-circuit 432 performs sampling to obtain and maintain 4(1), and the fourth secondary sequence sub-circuit 433 performs sampling to obtain and maintain 2(0).

Before a sixth trigger time T6 (that is, a time point Ln2), the first primary sequence sub-circuit 421 maintains 5(0), the second primary sequence sub-circuit 431 maintains 4(1), the first secondary sequence sub-circuit 422 maintains 3(1), the second secondary sequence sub-circuit 432 maintains 4(1), and the third secondary sequence sub-circuit 423 maintains 1(1), and the fourth secondary sequence sub-circuit 433 maintains 2(0). Therefore, at the sixth trigger time T6 (Ck2), the first arithmetic circuit 410 compensates the equalization sequence by the first secondary feedback sub-sequence sf1 (3(1)), the second secondary feedback sub-sequence sf2 (4(1)), the third secondary feedback sub-sequence sf3 (1(1)), and the fourth secondary feedback sub-sequence sf4 (2(0)), to obtain the first added sequence Sad1. In other words, the first arithmetic circuit 410 compensates the sixth bit by the first bit, the second bit, the third bit, and the fourth bit (secondary feedback sequences) sequentially passing through the data sampling circuit 450 to obtain the first added sequence Sad1. The second arithmetic sub-circuit 412 compensates the first added sequence Sad1 by the first primary feedback sub-sequence pfs1 to obtain the second added sub-sequence Sa2. In other words, the second arithmetic sub-circuit 412 compensates the sixth bit (the first added sequence Sad1) by the fifth bit just passing through the data sampling circuit 450 to obtain the second added sub-sequence Sa2. Therefore, a compensation manner in the embodiment of FIG. 7 is similar to a compensation manner in the embodiment of FIG. 4, and inter-symbol interference of the equalization sequence can be appropriately removed in both, so that error rates of data sampling and edge sampling are reduced.

Furthermore, as discussed above, at the sixth trigger point T6, the sixth bit (6(1), referred to as a current bit below) is to be sampled. The second secondary feedback sub-sequence sf2 output by the second secondary sequence sub-circuit 432 is the fourth bit (4(1)), and the second secondary feedback sub-sequence sf2 is the second bit that is passed through relative to the current bit. At the seventh trigger point T7, the seventh bit (7(0), referred to as a current bit below) is to be sampled. The seventh bit is sampled by the first primary sequence sub-circuit 421, and the second secondary feedback sub-sequence sf2 output by the second secondary sequence sub-circuit 432 is still the fourth bit (4(1)). In other words, the second secondary feedback sub-sequence sf2 is the third bit that is passed through relative to the current bit. According to the above description of the embodiments of FIG. 4, in some embodiments, each of the secondary feedback sequences (such as sf1, sf2) has a different gain value relative to the secondary sequences (such as S1, S2), and the gain value is related to a number of bits away from the current bit (referred to as a bit distance below). In some embodiments, a larger bit distance leads to smaller influence of the feedback sequence on the current bit. Therefore, because a bit distance of each of the secondary feedback sub-sequenced sf1, sf2, sf3, sf4 relative to the current bit varies (varies based on a trigger of the data clock Ck1 or the ID clock Ck2), each of the secondary sub-multiplications of the secondary sequence sub-circuits 422, 432, 423, 433 varies based on the data clock Ck1 or the ID clock Ck2. For example, a magnification value of the first secondary sub-magnification at a high level of the ID clock Ck2 is different from a magnification value of the first secondary sub-magnification at a low level of the ID clock Ck2.

Referring to FIG. 7, the edge sampling circuit 470 is configured to sample the first added sequence Sad1 according to the edge clock Cq1 to output the edge sequence. In some embodiments, the phase of the edge clock Cq1 differs from the phase of the data clock Ck1 by about 90 degrees. The edge sampling circuit 470 comprises a plurality of trigger sampling circuits 471, 472, 473, 461, 462, 463 (which may also be referred to as edge trigger sampling circuits to be distinguished from the trigger sampling circuit of the data sampling circuit 450), and the edge trigger sampling circuits 471, 472, 473, 461, 462, 463 sequentially sample the first added sequence Sad1 according to the edge clock Cq1 to output the edge sequence.

For ease of description, the edge trigger sampling circuits 471, 472, 473, 461, 462, 463 are respectively named as a first trigger sampling circuit 471, a second trigger sampling circuit 461, a third trigger sampling circuit 472, a fourth trigger sampling circuit 462, a fifth trigger sampling circuit 473, and a sixth trigger sampling circuit 463. The first trigger sampling circuit 471, the third trigger sampling circuit 472, and the fifth trigger sampling circuit 473 are triggered by the edge clock Cq1, and the second trigger sampling circuit 461, the fourth trigger sampling circuit 462, and the sixth trigger sampling circuit 463 are triggered by an inverse of the edge clock Cq1 (the inverse of the edge clock is referred to as an inverse edge clock cq2, IE clock). Because a connection between the trigger sampling circuits 471, 472, 473, 461, 462, 463 of the edge sampling circuit 470 is similar to a connection between the sequence circuits 421, 422, 423, 431, 432, 433 (or the trigger sampling circuits) of the data sampling circuit 450, operation thereof is also similar. The first trigger sampling circuit 471, the third trigger sampling circuit 472, and the fifth trigger sampling circuit 473 are sequentially connected in series, and the second trigger sampling circuit 461, the fourth trigger sampling circuit 462, and the sixth trigger sampling circuit 463 are sequentially connected in series. Trigger sampling circuits at last stages of the two sets of trigger sampling circuits connected in series are respectively the fifth trigger sampling circuit 473 and the sixth trigger sampling circuit 463. The fifth trigger sampling circuit 473 and the sixth trigger sampling circuit 463 output respective sampling results Se1, Se2. The sampling results Se1, Se2 are the foregoing edge sequence output to the clock and data recovery circuit 300.

Referring to FIG. 8, a location of a rising edge of the edge clock Cq1 is at about an edge of the first bit and the second bit (edge, referred to as a first bit end edge below), an edge of the third bit and the fourth bit (referred to as a third bit end edge below), an edge of the fifth bit and the sixth bit (referred to as a fifth bit end edge below), and an edge of the seventh bit and the eighth bit (referred to as a seventh bit end edge below). Therefore, the first trigger sampling circuit 471 sequentially samples the first bit end edge, the third bit end edge, the fifth bit end edge, and the seventh bit end edge, and the third trigger sampling circuit 472 and the fifth trigger sampling circuit 473 sequentially sample a sampling result of the first trigger sampling circuit 471. Likewise, the second trigger sampling circuit 461 sequentially samples a second bit end edge, a fourth bit end edge, a sixth bit end edge, and an eighth bit end edge, and the fourth trigger sampling circuit 462 and the sixth trigger sampling circuit 463 sequentially sample a sampling result of the second trigger sampling circuit 461.

Referring to FIG. 7 again, in some embodiments, the equalizer circuit 400 comprises a first dummy arithmetic circuit 415 and a second dummy arithmetic circuit 416. The first dummy arithmetic circuit 415 is located between the first arithmetic circuit 410 and the first trigger sampling circuit 471 for transmitting the first added sequence Sad1 to the first trigger sampling circuit 471. The second dummy arithmetic circuit 416 is located between the first arithmetic circuit 410 and the second trigger sampling circuit 461 for transmitting the first added sequence Sad1 to the second trigger sampling circuit 461. With the first dummy arithmetic circuit 415 and the second dummy arithmetic circuit 416, components that the equalization sequence passes through to enter the data sampling circuit 450 and reach the clock and data recovery circuit 300 are the same as components that the equalization sequence passes through to enter the edge sampling circuit 470 and reach the clock and data recovery circuit 300. Therefore, the data sequence and the edge sequence can be substantially synchronized.

Moreover, referring to FIG. 6 and FIG. 7 together, the equalizer circuit in FIG. 7 may comprise a secondary sequence circuit and an edge trigger sampling circuit similar to that of the equalizer circuit in FIG. 6. In some embodiments, the data sampling circuit 450 in FIG. 7 comprises a fifth secondary sequence sub-circuit and a sixth secondary sequence sub-circuit. The fifth secondary sequence sub-circuit is connected between the third secondary sequence sub-circuit 423 and the clock and data recovery circuit 300. The fifth secondary sequence sub-circuit is configured to sample the third secondary sub-sequence S3 according to the ID clock Ck2 to output a fifth secondary sub-sequence, and the fifth secondary sequence sub-circuit gains the fifth secondary sequence to output a fifth secondary feedback sub-sequence. The fifth secondary feedback sub-sequence is used to compensate the equalization sequence. The sixth secondary sequence sub-circuit is connected between the fourth secondary sequence sub-circuit 423 and the clock and data recovery circuit 300. The sixth secondary sequence sub-circuit is configured to sample the fourth secondary sub-sequence S4 according to the data clock Ck1 to output a sixth secondary sub-sequence, and the sixth secondary sequence sub-circuit gains the sixth secondary sub-sequence to output a sixth secondary feedback sub-sequence. The sixth secondary feedback sub-sequence is used to compensate the equalization sequence. The fifth secondary sub-sequence and the sixth secondary sub-sequence are the data sequence and are output to the clock and data recovery circuit 300.

The edge sampling circuit 470 comprises a seventh trigger sampling circuit and an eighth trigger sampling circuit. The seventh trigger sampling circuit is connected between the fifth trigger sampling circuit 473 and the clock and data recovery circuit 300, and the eighth trigger sampling circuit is connected between the sixth trigger sampling circuit 463 and the clock and data recovery circuit 300. Operation is similar to that of the fifth trigger sampling circuit 473 and the sixth trigger sampling circuit 463, and details are not described again.

Similarly, in some embodiments, the data sampling circuit 450 comprises a seventh secondary sequence sub-circuit and an eighth secondary sequence sub-circuit, and the edge sampling circuit 470 comprises a ninth trigger sampling circuit and a tenth trigger sampling circuit. Details are not described again.

In summary, according to some embodiments, the decision feedback equalizer circuit can remove inter-symbol interference of the equalization sequence on the edge and on the data, so that the bit error rate of the clock and data recovery circuit 300 is reduced.

What is claimed is:

1. An equalizer circuit, comprising:
   a first arithmetic circuit, configured to compensate an equalization sequence by a plurality of secondary feedback sequences to output a first added sequence;
   a second arithmetic circuit, configured to compensate the first added sequence by a primary feedback sequence to output a second added sequence;
   a data sampling circuit, comprising:
     a primary sequence circuit, configured to sample the second added sequence according to a data clock to output a primary sequence, the primary sequence circuit gaining the primary sequence to output the primary feedback sequence; and
     a plurality of secondary sequence circuits, configured to sequentially sample the primary sequence according to the data clock to output a plurality of secondary sequences, the secondary sequence circuits gaining the corresponding secondary sequences to output the secondary feedback sequences; and
   an edge sampling circuit, configured to sample the first added sequence according to an edge clock to output an edge sequence.

2. The equalizer circuit according to claim 1, wherein
   a rate of the equalization sequence is substantially twice a rate of the data clock, and the rate of the equalization sequence is substantially twice a rate of the edge clock,
   the primary feedback sequence comprises a first primary feedback sub-sequence and a second primary feedback sub-sequence, and the second added sequence comprises a first added sub-sequence and a second added sub-sequence;
   the second arithmetic circuit comprises a first arithmetic sub-circuit and a second arithmetic sub-circuit, the first arithmetic sub-circuit being configured to compensate the first added sequence the first primary feedback sub-sequence to output the first added sub-sequence, and the second arithmetic sub-circuit being configured to compensate the first added sequence the second primary feedback sub-sequence to output the second added sub-sequence;

the primary sequence circuit comprises:
  a first primary sequence sub-circuit, configured to sample the first added sub-sequence according to the data clock to output a first primary sub-sequence, the first primary sub-sequence circuit gaining the first primary sub-sequence to output the first primary feedback sub-sequence; and
  a second primary sequence sub-circuit, configured to sample the second added sub-sequence according to an inverse of the data clock to output a second primary sub-sequence, the second primary sequence sub-circuit gaining the second primary sub-sequence to output the second primary feedback sub-sequence;

the data sampling circuit comprises four of the plurality of secondary sequence circuits, the four secondary sequence circuits are a first secondary sequence sub-circuit, a second secondary sequence sub-circuit, a third secondary sequence sub-circuit, and a fourth secondary sequence sub-circuit;

the first secondary sequence sub-circuit being configured to sample the first primary sub-sequence according to the inverse of the data clock to output a first secondary sub-sequence, and the first secondary sequence sub-circuit gaining the first secondary sub-sequence to output a first secondary feedback sub-sequence;

the second secondary sequence sub-circuit being configured to sample the second primary sub-sequence according to the data clock to output a second secondary sub-sequence, and the second secondary sequence sub-circuit gaining the second secondary sub-sequence to output a second secondary feedback sub-sequence;

the third secondary sequence sub-circuit being configured to sample the first secondary sub-sequence according to the inverse of the data clock to output a third secondary sub-sequence, and the third secondary sequence sub-circuit gaining the third secondary sub-sequence to output a third secondary feedback sub-sequence;

the fourth secondary sequence sub-circuit being configured to sample the second secondary sub-sequence according to the data clock to output a fourth secondary sub-sequence, and the fourth secondary sequence sub-circuit gaining the fourth secondary sub-sequence to output a fourth secondary feedback sub-sequence; and the first arithmetic circuit is configured to compensate the equalization sequence by the first secondary feedback sub-sequence, the second secondary feedback sub-sequence, the third secondary feedback sub-sequence, and the fourth secondary feedback sub-sequence, to output the first added sequence.

3. The equalizer circuit according to claim 2, wherein the edge sampling circuit comprises a plurality of edge trigger sampling circuits, the plurality of edge trigger sampling circuits sequentially sample the first added sequence according to the edge clock to output the edge sequence, and a number of the edge trigger sampling circuits is equal to a number of the sequence circuits.

4. The equalizer circuit according to claim 2, wherein the first primary sequence sub-circuit comprises:
  a first primary trigger sampling sub-circuit, configured to sample the first added sub-sequence according to the data clock to output the first primary sub-sequence; and
  a first primary gain sub-circuit, configured to gain the first primary sub-sequence by a first primary sub-magnification to output the first primary feedback sub-sequence;

the second primary sequence sub-circuit comprises:
  a second primary trigger sampling sub-circuit, configured to sample the second added sub-sequence according to the inverse of the data clock to output the second primary sub-sequence; and
  a second primary gain sub-circuit, configured to gain the second primary sub-sequence by a second primary sub-magnification to output the second primary feedback sub-sequence; and the first primary sub-magnification and the second primary sub-magnification each is a constant between −1 and 0.

5. The equalizer circuit according to claim 4, wherein the edge sampling circuit comprises a plurality of edge trigger sampling circuits, the plurality of edge trigger sampling circuits sequentially sample the first added sequence according to the edge clock to output the edge sequence, and a number of the plurality of edge trigger sampling circuits being equal to a number of the sequence circuits.

6. The equalizer circuit according to claim 4, wherein each of the trigger sampling circuits is a D-type flip flop, a phase of the data clock substantially differing from a phase of the edge clock by about 90 degrees, and each of the arithmetic circuits being an adder.

7. The equalizer circuit according to claim 4, wherein
  the first secondary sequence sub-circuit comprises:
    a first secondary trigger sampling sub-circuit, configured to sample the first primary sub-sequence according to the inverse of the data clock to output the first secondary sub-sequence; and
    a first secondary gain sub-circuit, configured to gain the first secondary sub-sequence by a first secondary sub-magnification to output the first secondary feedback sub-sequence;

the second secondary sequence sub-circuit comprises:
    a second secondary trigger sampling sub-circuit, configured to sample the second primary sub-sequence according to the data clock to output the second secondary sub-sequence; and
    a second secondary gain sub-circuit, configured to gain the second secondary sub-sequence by a second secondary sub-magnification to output the second secondary feedback sub-sequence;

the third secondary sequence sub-circuit comprises:
    a third secondary trigger sampling sub-circuit, configured to sample the first secondary sub-sequence according to the inverse of the data clock to output the third secondary sub-sequence; and
    a third secondary gain sub-circuit, configured to gain the third secondary sub-sequence at a third secondary sub-magnification to output the third secondary feedback sub-sequence;

the fourth secondary sequence sub-circuit comprises:
    a fourth secondary trigger sampling sub-circuit, configured to sample the second primary sub-sequence according to the data clock to output the fourth secondary sub-sequence; and
    a fourth secondary gain sub-circuit, configured to gain the fourth secondary sub-sequence by a fourth secondary sub-magnification to output the fourth secondary feedback sub-sequence; and the first secondary sub-magnification, the second secondary sub-magnification, the third secondary sub-magnification, and the fourth secondary sub-magnification each being a constant between −1 and 0.

8. The equalizer circuit according to claim 7, wherein the edge sampling circuit comprises a plurality of edge trigger sampling circuits, the plurality of edge trigger sampling circuits sequentially sample the first added sequence according to the edge clock to output the edge sequence, and a number of the edge trigger sampling circuits is equal to a number of the sequence circuits.

9. The equalizer circuit according to claim 7, wherein each of the trigger sampling circuits is a D-type flip flop, a phase of the data clock substantially differs from a phase of the edge clock by about 90 degrees, and each of the arithmetic circuits is an adder.

10. The equalizer circuit according to claim 7, wherein
a magnification value of the first secondary sub-magnification at a high level of the inverse of the data clock is different from a magnification value of the first secondary sub-magnification at a low level of the inverse of the data clock;

a magnification value of the second secondary sub-magnification at a high level of the data clock is different from a magnification value of the second secondary sub-magnification at a low level of the data clock;

a magnification value of the third secondary sub-magnification at the high level of the inverse of the data clock is different from a magnification value of the third secondary sub-magnification at the low level of the inverse of the data clock; and a magnification value of the fourth secondary sub-magnification at the high level of the data clock is different from a magnification value of the fourth secondary sub-magnification at the low level of the data clock.

11. The equalizer circuit according to claim 10, wherein each of the trigger sampling circuits is a D-type flip flop, a phase of the data clock substantially differing from a phase of the edge clock by about 90 degrees, and each of the arithmetic circuits being an adder.

* * * * *